United States Patent
Esbensen et al.

(10) Patent No.: US 8,745,581 B2
(45) Date of Patent: Jun. 3, 2014

(54) METHOD AND SYSTEM FOR SELECTIVELY COPYING PORTIONS OF A DOCUMENT CONTENTS IN A COMPUTING SYSTEM (SMART COPY AND PASTE

(75) Inventors: Daniel Esbensen, Blue Diamond, NV (US); Daniel James Swain, San Diego, CA (US)

(73) Assignee: Touch Technologies, Inc., San Diego, CA (US)

( * ) Notice: Subject to any disclaimer, the term of this patent is extended or adjusted under 35 U.S.C. 154(b) by 265 days.

(21) Appl. No.: 13/165,592

(22) Filed: Jun. 21, 2011

(65) Prior Publication Data

US 2011/0314446 A1    Dec. 22, 2011

Related U.S. Application Data

(60) Provisional application No. 61/357,057, filed on Jun. 21, 2010.

(51) Int. Cl.
G06F 9/44    (2006.01)

(52) U.S. Cl.
USPC ............................ 717/110; 717/113; 717/125

(58) Field of Classification Search
None
See application file for complete search history.

(56) References Cited

U.S. PATENT DOCUMENTS

| | | | |
|---|---|---|---|
| 6,009,441 A | 12/1999 | Mathieu et al. | |
| 6,257,774 B1 | 7/2001 | Stack | |
| 6,305,008 B1 | 10/2001 | Vaidyanathan et al. | |
| 6,311,323 B1 * | 10/2001 | Shulman et al. | 717/113 |
| 6,466,240 B1 * | 10/2002 | Maslov | 717/113 |
| 6,654,953 B1 | 11/2003 | Beaumont et al. | |
| 6,857,119 B1 | 2/2005 | Desai | |
| 6,941,558 B2 | 9/2005 | Hill et al. | |
| 6,996,771 B1 | 2/2006 | O'Brien | |
| 7,043,692 B2 | 5/2006 | Yu | |
| 7,127,707 B1 | 10/2006 | Mishra et al. | |
| 7,155,706 B2 | 12/2006 | Snover et al. | |
| 7,316,003 B1 * | 1/2008 | Dulepet et al. | 717/110 |
| 7,627,851 B2 | 12/2009 | Lotter | |
| 7,814,461 B2 * | 10/2010 | Shulman et al. | 717/110 |
| 8,171,460 B2 * | 5/2012 | Pizzoli et al. | 717/125 |
| 8,229,579 B2 * | 7/2012 | Eldridge et al. | 717/110 |
| 8,312,427 B2 * | 11/2012 | Hutchison et al. | 717/110 |
| 8,656,348 B2 * | 2/2014 | Smialek et al. | 717/110 |
| 2004/0015843 A1 | 1/2004 | Quan, Jr. | |
| 2004/0031017 A1 | 2/2004 | Vaidyanathan et al. | |
| 2004/0078785 A1 | 4/2004 | Dutt et al. | |
| 2004/0117771 A1 | 6/2004 | Venkatapathy | |
| 2004/0230964 A1 | 11/2004 | Waugh et al. | |
| 2004/0268311 A1 * | 12/2004 | Pizzoli et al. | 717/125 |
| 2005/0149871 A1 * | 7/2005 | Broman et al. | 715/724 |

(Continued)

OTHER PUBLICATIONS

Ives et al., "Interactive Data Integration through Smart Copy and Paste", CIDR 2009, pp. 1-10; <http://citeseerx.ist.psu.edu/viewdoc/summary?doi=10.1.1.145.4678>.*

Kandel et al., "Wrangler: Interactive Visual Specification of Data Transformation Scripts", 2011 ACM, CHI 2011, May 7-12, 2011, Vancouver, BC, Canada, pp. 3363-3372; <http://dl.acm.org/results.cfm?h=1&cfid=417702354&cftoken=80698340>.*

(Continued)

*Primary Examiner* — Thuy Dao
*Assistant Examiner* — Ben C Wang
(74) *Attorney, Agent, or Firm* — Quine Intellectual Property Law Group, P.C.; Stephen J. LeBlanc

(57) ABSTRACT

An improved method for generating text by using snippets of existing text and providing a command structure allowing a user to cut and paste from existing text.

20 Claims, 3 Drawing Sheets

(56) References Cited

U.S. PATENT DOCUMENTS

| | | | |
|---|---|---|---|
| 2005/0183058 A1 | 8/2005 | Meijer et al. | |
| 2005/0229154 A1 | 10/2005 | Hiew et al. | |
| 2005/0235258 A1 | 10/2005 | Wason | |
| 2006/0218446 A1 | 9/2006 | Crawford | |
| 2006/0250360 A1* | 11/2006 | Goodwin et al. | 345/163 |
| 2007/0006142 A1* | 1/2007 | Shulman et al. | 717/113 |
| 2007/0168909 A1 | 7/2007 | Vaidyanathan et al. | |
| 2008/0127151 A1 | 5/2008 | Kawahito et al. | |
| 2008/0270981 A1* | 10/2008 | Hutchison et al. | 717/110 |
| 2009/0006967 A1 | 1/2009 | Harris et al. | |
| 2009/0125130 A1* | 5/2009 | Eldridge et al. | 717/110 |
| 2009/0125131 A1* | 5/2009 | Eldridge et al. | 717/113 |
| 2009/0254880 A1 | 10/2009 | Gryko et al. | |
| 2010/0235593 A1* | 9/2010 | Yadav et al. | 711/161 |
| 2010/0251093 A1* | 9/2010 | Broman et al. | 715/227 |
| 2011/0314446 A1* | 12/2011 | Esbensen et al. | 717/110 |
| 2012/0291010 A1* | 11/2012 | Hutchison et al. | 717/110 |

OTHER PUBLICATIONS

Haralambiev et al., "Applying Source Code Analysis Techniques", 2011 IEEE, pp. 1-2; <http://ieeexplore.ieee.org/stamp/stamp.jsp?tp=&arnumber=5929241>.*

Gerhart, "Correctness-preserving program transformations", Annual Symposium on Principles of Programming Languages, Proceedings of the 2nd ACM SIGACT-SIGPLAN symposium on Principles of programming languages, California, Year of Publication: 1975, pp. 54-66.

Samsom, et al. (1993) "SynGuide: An environment for doing interactive Correctness Preserving Transformations", IEEE workshop on VLSI signal processing, Veldhoven, The Netherlands, Oct. 1993. Also in VLSI Signal Processing VI, (eds.: L. Eggermont, P. Dewilde, E. Deprettere, J. van Meerbergen), IEEE Press, New York, Dated: 1993, pp. 269-277.

* cited by examiner

METHOD AND SYSTEM FOR SELECTIVELY COPYING PORTIONS OF A DOCUMENT CONTENTS IN A COMPUTING SYSTEM (SMART COPY AND PASTE

CROSS-REFERENCE TO RELATED APPLICATIONS

This application claims the benefit of provisional application 61/357,057 filed Jun. 21, 2010 which is incorporated herein by reference for all purposes.

FIELD OF THE INVENTION

The present invention relates to information processing systems and methods. More particularly, the present invention is directed to methods and/or apparatus relating to program code editing and other digital document editing and smart cutting and pasting in various contexts.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

PRECAUTIONARY REQUEST TO FILE AN INTERNATIONAL APPLICATION, DESIGNATION OF ALL STATES, AND STATEMENT THAT AT LEAST ONE APPLICANT IS A UNITED STATES RESIDENT OR ENTITY

Should this document be filed electronically or in paper according to any procedure indicating an international application, Applicant hereby requests the filing of an international application and designation of all states. For purposes of this international filing, all inventors listed on a cover page or any other document filed herewith are applicants for purposes of United States National Stage filing. For purposes of international filing, any assignees listed on a cover page or any other document filed herewith are applicants for purposes of non-United States national stage filing, or, if no assignee is listed, all inventors listed are applicants for purposes of non-United States national stage filing. For purposes of any international filing, applicants state that at least one applicant is a United States resident or United States institution. Should this application be filed in as a national application in the United States, this paragraph shall be disregarded.

APPENDIX

This application is being filed with paper appendices totaling 5 pages containing an example computer source code listings for a specific example embodiment of the invention. These appendices and all other papers filed herewith, including papers filed in any attached Information Disclosure Statement (IDS), are incorporated herein by reference. The appendix contains further examples of source code listings and information related to various embodiments of the invention at various stages of development.

BACKGROUND OF THE INVENTION

A task that is commonly performed in computing environments is copying and pasting text in documents of various types. Many different approaches are known, but determining a optimal approach for particular situations is challenging. Typical copy and paste systems use a clipboard, smart clipboard, automatically populated clipboard or drop-down list, etc.

One area of particular interest in manipulating and copying and pasting text is in the field of creating logic code for running on computer systems. Such code is typically written in a computer programming language and is typically created using a document or text editor on a computer system. One example of text modification or editing functionality designed for such systems is discussed in TECHNIQUES FOR OFFERING AND APPLYING CODE MODIFICATIONS, US Application 2009/0254880 A1, filed Apr. 3, 2008, which discusses a system wherein code snippets are previously identified and stored prior to use. In contrast to the present invention, it does not suggest a command set or mechanism that specifies replacement information. It only allows previously identified "placeholder" text to be replaced.

United States Patent Application 20090006967 A1, LIVE COPY-PASTE, provides for copying and pasting information from one application to another that allows identical information to be present in multiple locations. Pasted information can be updated based on changes to the source of the pasted information. With updating pasted information, the information can remain identical in both locations even if a change takes place after the paste.

When writing certain types of digital documents (source code in particular, but also various legal, technical, or database documents) there tends to be text patterns in the document or source code (referred to herein as "code snippets" or "snippets") that emerge dynamically during the writing process. When the snippets are of common use, they are can be saved into a snippet data store for reuse. However, snippets that emerge dynamically and are not of common use present a challenge to the programmer. Currently, programmers deal with these snippets through a lengthy and error prone copy, paste, and replace process. This process generally consists of:

Copying the snippet (by selecting text using a mouse or other method and then invoking a copy action).
Moving the cursor to just below the snippet or to another desired paste location.
Pasting the copied snippet into the new location.
Using the mouse or moving the cursor to the sections of the copied snippet that require replacement.
Deleting pieces of the copied code that need replacement and replacing the code.
Repeating all of these steps for each reuse of the snippet.

OTHER REFERENCES

| | | | |
|---|---|---|---|
| 7,043,692 | Windows resource file parameterization system and method | May, 2006 | Yu |
| 6,996,771 | Dynamic parameter modification | February, 2006 | O'Brien |
| 20050235258 | Method, plug-in and program product for customizing java bean properties | October, 2005 | Wason |

| | -continued | | |
|---|---|---|---|
| 20050229154 | System and method for generating and maintaining software code | October, 2005 | Hiew et al. |
| 20050183058 | Fast flattening of nested streams | August, 2005 | Meijer et al. |
| 6,857,119 | Techniques for modifying a compiled application | February, 2005 | Desai |
| 20040230964 | System and method for managing source code and acquiring metrics in software development | November, 2004 | Waugh et al. |
| 20040117771 | Preprocessor-based source code instrumentation | June, 2004 | Venkatapathy |
| 20040078785 | System and method for marking software code | April, 2004 | Dutt et al. |
| 20040015843 | Method and program product for structured comment assists in computer programming | January, 2004 | Quan, Jr. |
| 6,654,953 | Extending program languages with source-program attribute tags | November, 2003 | Beaumont et al. |
| 6,305,008 | Automatic statement completion | October, 2001 | Vaidyanathan et al. |
| 6,257,774 | Application program and documentation generator system and method | July, 2001 | Stack |
| 6,009,441 | Selective response to a comment line in a computer file | December, 1999 | Mathieu et al. |
| 20090006967 A1 | Live Copy-Paste | Jan. 01, 2009 | Harris, et al. |

SUMMARY OF THE INVENTION

The present invention in various embodiments entails a method and/or apparatus and/or digital logic circuit and/or system for improving copying and pasting in various document editing situations and in particular examples in computer source code editing environments. The invention improves efficiency and accuracy of writing computer source code among other applications as described herein. Using the present invention, according to specific embodiments, a user moves a cursor to just under a snippet it is desired to copy and by either entering a "Smart Copy" command and/or pressing a "Smart Key" to invoke the command, completes the copy. As indicated herein, the copy can include selected edits or replacements.

In specific embodiments, a snippet can be copied and then pasted multiple times and can also have certain modifications, such as replacing text strings.

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

The functional aspects of the invention that are implemented on a computer, as will be understood from the teachings herein, may be implemented or accomplished using any appropriate implementation environment or programming language, such as Python, Perl, C#, C++, Cobol, Pascal, Java™ programming language, Java-script™ programming language, assembly or machine code programming, custom logic circuits, etc. All references, publications, patents, and patent applications cited herein are hereby incorporated by reference in their entirety for all purposes.

In various embodiments, the invention involves handling data that is presented to a user as an useful output, such as a screen display of an image or text. Such outputting of digital data is understood in the art and examples are provided herein. Such output involves the physical transformation of a textual or graphical display to provide meaningful output to the user. Document editing and storage likewise involves physical transformation in the state of electronic storage components used to store and display the documents and the data involved with document editing.

As user herein, any reference to "the invention" shall be understood to be characterizing the invention according to specific embodiments. Different embodiments of the invention shall not be limited except as provided for in the attached claims.

DESCRIPTION OF SPECIFIC EMBODIMENTS

General Methods

Figure 1:
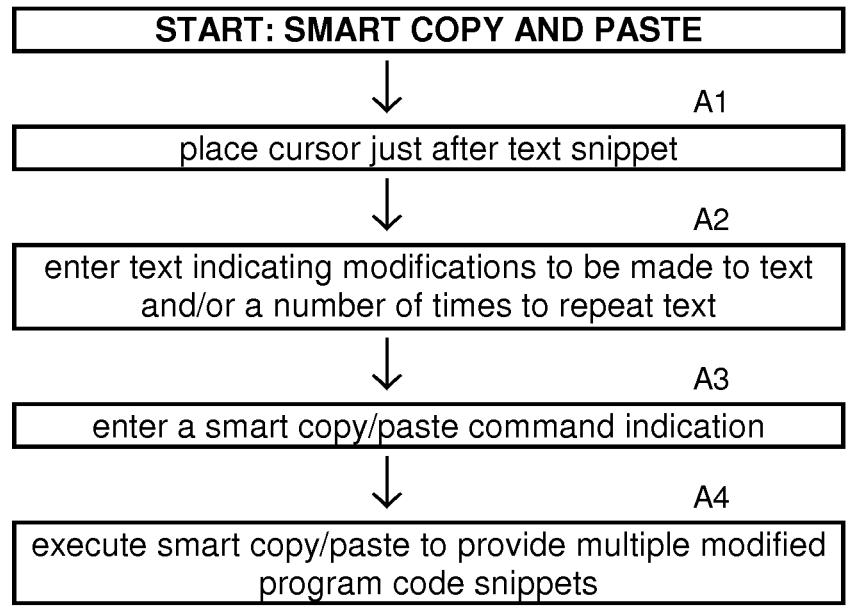
FIG. 1 is a flow chart illustrating a general smart copy paste method according to specific embodiments of the invention.
Figure 2:
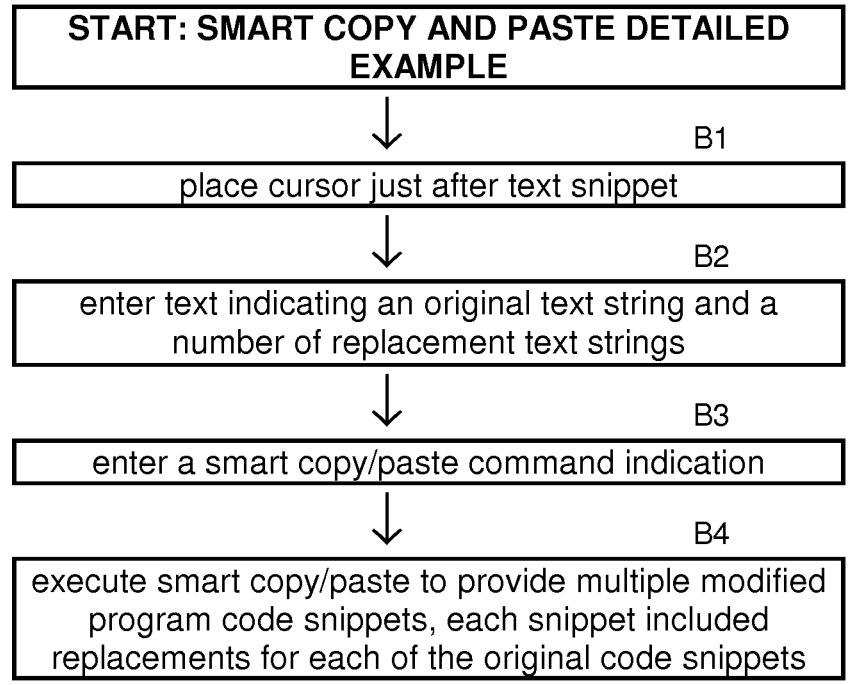
FIG. 2 is a flow chart illustrating a detailed smart copy paste method according to specific embodiments of the invention.

FIG. 1 is a flow chart illustrating a general smart copy paste method according to specific embodiments of the invention. As shown in the figure, the invention can be embodied in a logical method suitable for implementation by any appropriately configured information handling system, including general purpose computing systems and information handling displays and subsystems. FIG. 2 is a flow chart illustrating a detailed smart copy paste method according to specific embodiments of the invention.

According to specific embodiments, the invention allows for smart copy and pasting as follows. Given an example snippet, such as:

```
My_city = payroll(city);
New_city = Process_one_city(My_city);
Write ('The new city is: %s', New_city);
Write_audit (New_city);
```

According to specific embodiments, to copy and paste the snippet three times, and then replace "city" with each of "street", "zipcode", and "country", a user would position the cursor under the last line of the snippet, and enter a single "Smart Copy" command such as:

/city << street, zipcode, country

This is followed by pressing the "Smart Key" (CTRL+ENTER in one embodiment, or simply ENTER in an alternative embodiment, or a mouse click, or a copy command such as CNTRL+C). In this example, the "Smart Copy" command automatically causes the four lines of snippet text to be copied and pasted three times: Once for "street", once for "zipcode", and once for "country". Then, for each of the three copies, all occurrences of the word "city" are replaced. In the first copy, "city" is replaced with "street". In the second copy, "city" is replaced with "zipcode", and in the third copy, "city" is replaced with "county".

The resultant source code looks like:

```
My_city = payroll(city);
New_city = Process_one_city(My_city);
Write ('The new city is: %s', New_city);
Write_audit (New_city);
My_street = payroll(street);
New_street = Process_one_street(My_street);
Write ('The new street is: %s', New_street);
Write_audit (New_street);
My_zipcode = payroll(zipcode);
New_zipcode = Process_one_zipcode(My_zipcode);
Write ('The new zipcode is: %s', New_zipcode);
Write_audit (New_zipcode);
My_country = payroll(country);
New_country = Process_one_country(My_country);
Write ('The new country is: %s', New_country);
Write_audit (New_country);
```

From the above specific example, various other embodiments of the invention will be understood to persons of skill in the art. A smart copy command of the invention can be indicated using any hardware or software input mechanisms provided on an information processing device, such as command line text as indicated above. Other means for indicating an area in an original text portion of a document include moving a cursor with a mouse, track pad, touch screen, voice activation, etc. Other means for indicating replacement text include indicating or highlighting a word or phrase with a cursor, inputting a word using voice recognition, inputting a word via a drop down list or menu, etc. Activating a command can be achieved using a mouse click or gesture, touch screen, voice recognition spoken word, etc.

Additional Optional Features

According to specific embodiments, the original snippet is assumed to be whatever "paragraph" is directly above the cursor. A code "paragraph" can be variously determined, as will be understood in the art, and can depend on the particular programming language that the code is written. In a particular example embodiment, the invention scans up from the current cursor location to the first blank line above that location, and in this example, the blank line is the top border of the original code snippet and the cursor location is the bottom border.

However, in other embodiments, a code paragraph may be indicated by other delimiters, such as the first hard return or hard return followed by a tab when dealing with non-source-code text documents, or a delimiter specific to particular source code, such as "{" or "}". In specific embodiments, the command line may allow the user to indicate a particular delimited either by typing data or codes indicating the delimiter or by highlighting the text prior to completing the smart copy command.

In a further aspect, according to specific embodiments, the new modified text is pasted starting on the line where the cursor is. In one alternative embodiment, the pasted text can be highlighted when pasted so that it can be easily cut and moved to a different location or the pasted text can be put on the clip board and then pasted by the user to a desired location.

In a further example embodiment, pressing the "Smart-Copy" key can open a new window, optionally with multiple panes. In one example, three panes are opened. One window holds the command line, one holds the snippet to be modified (the "original" snippet), and one that shows the modifications to the snippet as the command is entered.

In one further embodiment, the code snippet is just the line directly above the cursor. This is useful when doing things like:

```
city$ = getsymbol$('CITY')
city<< state,zipcode,country    <ctrl+enter>
```

Note that in this example, <ctrl+enter> this is the smart copy key or command. In the above example, this command would generate:

```
city$ = getsymbol$('CITY')
state$ = getsymbol$('STATE')
zipcode$ = getsymbol$('ZIPCODE')
country$ = getsymbol$('COUNTRY')
```

In an further embodiment, a smart copy is activated when text is highlighted and a smart-copy key is pressed or command is other-wise indicated (such as by a "right-click" context menu selection). This embodiment than allows a user to input further parameters, for example by one or more pop-up window. In this embodiment, the user highlights text, indicates the command, and is then presented with an input indication such as:

```
SmartCopy, Replace What: _____

SmartCopy, Replace <original text> with: _____
(Press ENTER to add additional replacement texts,
 and CNTRL-ENTER to finish)
```

This provides just one example of a window driven user interface for the smart copy paste command. It will be understood in the art that many variations to either the command line input method or the windows driven input method are possible within the scope of the invention.

Other Implementation Details

It will be understood from the teachings provided herein, that a method according to the present invention can be variously implemented in computing systems. In one implementation, computer-understandable logic instructions related to the present invention can be included in an application program and/or can be invoked by an application program during initiation and/or execution.

In specific embodiments, such a system can be initiated by a logic routine during program initiation or operating system initiation. It will further be understood from the teachings herein, that logic routines according to the present invention can be included in a logic instruction compiler or logic instruction interpreter and/or include or other files associated with such a programming environment.

Embodiments in an Information Processing Architecture

As discussed herein, according to specific embodiments, the present invention can be embodied in a method implemented on an information handling system, such as a computer or a variety of other devices that include information handling functionality. Such other devices can include, but are not limited to, personal digital assistants (PDAs), cellular telephones, television set top systems or cable systems interfaces, toys, home appliances with information handling abilities, scientific and diagnostic systems, and machinery or industrial systems with information handling abilities.

Typically, information handling in such systems is performed by binary logic circuits. According to further specific embodiments, the present invention can be embodied in either an information handling system or circuitry or components of an information handling system performing according to the description herein.

According to further specific embodiments, the invention can be embodied as one or more sets of instructions and/or data that are used to program or guide or affect the operation of an information handling system. As is known in the art, these sets of instructions and/or data can be distributed to users stored or recorded on a storage medium, such as a disk, diskette, hard-drive, CD-ROM, tape, ROM, EPROM, ASIC, PLD, etc., and according to specific embodiments, the invention can be embodied as such a medium storing data and/or instructions that when loaded into an appropriately configured information system will cause the system to performing according to the description herein.

As is further known in the art, sets of instructions and/or data can be transmitted to an information handling system over a communication medium (such as the internet, a local area network, a wireless network, a telephone line, a cable-television system, etc.) from a remote data holding location (such as a server) and thereby when loaded into an appropriately configured information system will cause the system to performing according to the description herein.

Figure 3:
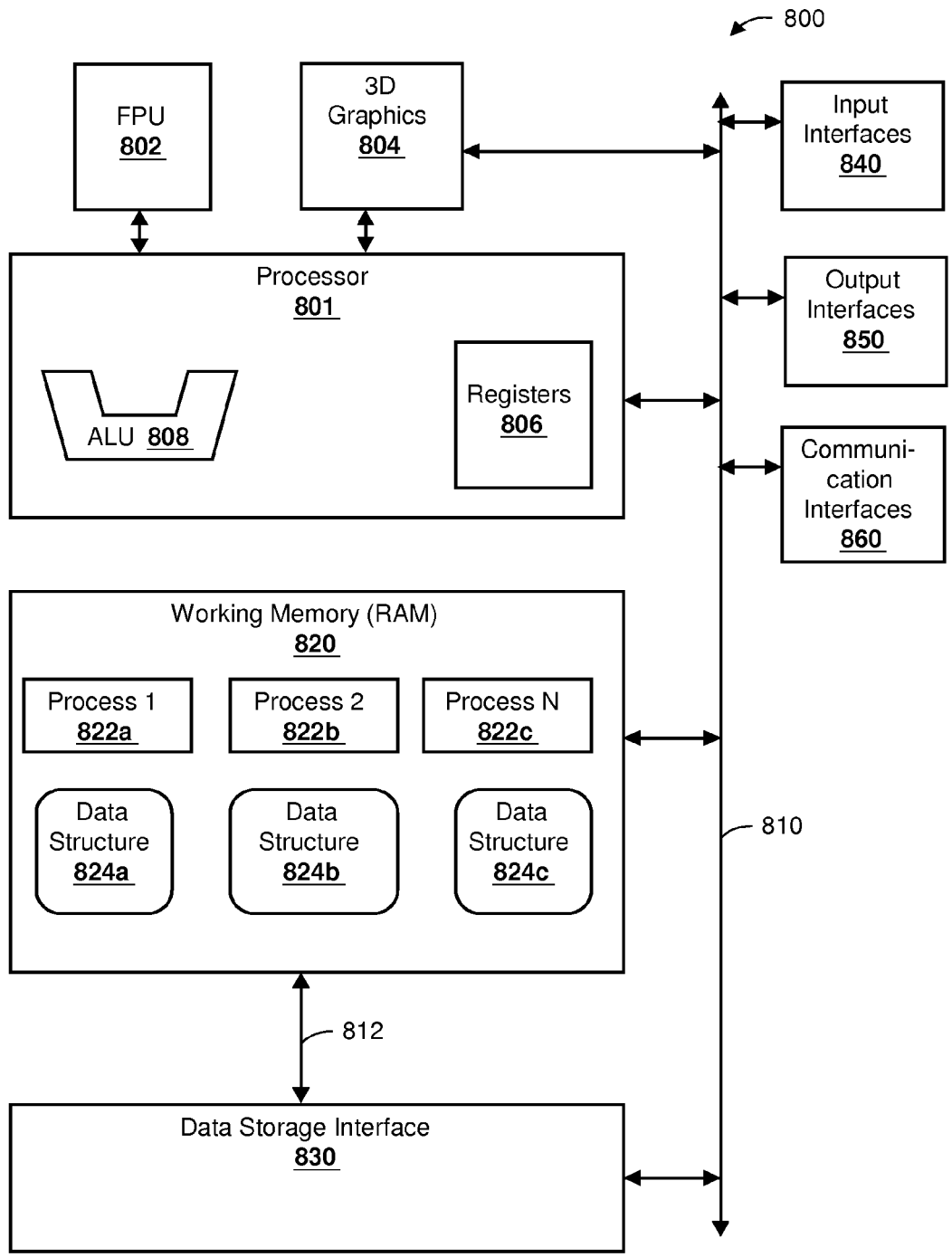
FIG. 3 illustrates an example architecture of an example information handling system relevant to various specific embodiments of the present invention.

FIG. 3 illustrates an example architecture of an example information handling system relevant to various specific embodiments of the present invention. As will be understood to those of skill in the art and from the teachings provided herein, the general organization of a system 800 as shown in FIG. 3 is representative of various information systems ranging from computer-on-a-chip type circuits in a household appliance or toy to super computer systems and distributed systems. In some information handling systems, the various components shown in FIG. 3 may be separable computer chips or separable circuit areas on a computer chip, whereas in other information handling systems, some or all of the functions shown in FIG. 3 will be performed by shared circuitry or implemented in software. Some systems will not have all of the components shown in FIG. 3, and other systems will have additional core components. FIG. 3 does not represent the only device architecture on which the present invention can be performed and it will be understood that the present invention is applicable to a variety of types of information processing devices.

An information handling device typically includes one or more processors, such as 801. Processor 801 is generally characterized as being able to perform different logic operations on data, where logic operations are selected or specified by one or more instructions. In the example of a personal computer system or workstation, processor 801 can represent any of the number of well-known microprocessors manufactured by companies such as the Intel company, AMD company, Zilog company, and Motorola company. Processor 801 can also represent a subset of circuitry configured as a processor in an integrated circuit such as an ASIC or PLD.

A processor 801 can at times work in cooperation with other information handling circuits (which may or may not also be processors) that may have special-purpose abilities. These circuits may be external from the processor or internal with the processor. As an example, FIG. 3 shows a floating point unit (FPU) 802 and a 3D graphics module 804. A processor 801 may also have a number of structures to facilitate its operation, such as, for example, a set of internal registers 806 and/or an arithmetic logic unit (ALU) 808. In some processors, these structures are internal to the processor circuitry.

In most information handling systems, various modules communicate with other modules over one or more communication paths or buses. FIG. 3 shows a representative system bus 810 and a separate auxiliary bus 812. The illustrated buses can represent signal channels on an integrated circuit, communication connections on a printed circuit board, connection between two or more printed circuit board or a backplane, or any other channels used by the modules to exchange data or control signals.

In various information processing systems, separable modules can include such things as working memory 820, one or more storage systems 830, one or more input interfaces 840, one or more output interfaces 850. Some information systems also include a communication interface (such as a network interface or a modem) 860 for communicating with other computer systems, such as over a network. These modules are shown in FIG. 3 as broadly representative of aspects of a computing system.

In typical information processing systems, working memory 820 is some type of random access memory (RAM) that can be quickly accessed by processor 801 and possibly by other processors. In general purpose computers and other computer systems, during operation, such a working memory contains the data and instructions for one or more processes 822, including operating system processes. Each process generally represents an executing program or program thread. Working memory 820 can also include one or more data structures 824, which may be associated with particular processes or may be shared or system-wide. These data structures can include data tables or any other data structures that can be represented in digital memory. Therefore, in many general purpose information processing systems (such as personal computers) working memory 820 will be understood in the art as containing resident parts of an operating system and/or of various application systems and/or data files and/or other logic modules or digital data.

As is familiar to those skilled in the art, an information processing system that is a general purpose type computer system further generally includes an operating system and at least one application program. The operating system is a set of logic instructions that control the computer system's operation and the allocation of resources. The application program is a set of logic instructions (possibly also including data) to perform tasks desired by the user. During operation, both may be resident in a memory system such as 820.

Storage 830 is illustrated to represent other, usually more long-term (also called non-volatile) data storage. In general purpose computers, this typically includes one or more disk-type systems (such as hard-disk drives, floppy drives, CD-ROMs, etc.) and can also include a variety of other storage devices. Storage 830 can be used to supplement working memory 820 through a variety of known paging techniques. Storage 830 can also include remote storage systems available over a network. In hand-held devices especially, storage 830 may consist sole of read-only-memory (ROM) used to store executable components of the system. Depending on particular implementations, 830 can represent either storage systems that are part of computer system 800 or an interface to external storage systems.

Input interfaces 840 can represent circuits, devices, and/or logic or instructions that can provide for video, audio, keyboard, pointer, other input to a computer system. Typical input devices include such things as a keyboard or keypad, touch-screen, mouse, microphone, camera, environmental sensors (e.g. a thermostat or a motion detection), etc. Input interfaces 840, along with possibly other modules in the computer system, handle tasks involved in translating external data (such as key strokes) to the appropriate encoded data (typically binary data). These translation tasks can involve multiple steps, performed in various parts of a computer system. Depending on particular implementations, 840 can represent input devices and associated interface logic or only interface logic to particular input devices.

Output interfaces 850 represents circuits, devices, and/or instructions that can provide for video, audio, print or other output from a computer system and can also represent actual output devices. Typical output devices include a display screen, a printer, a speaker, etc. Output can also be in the form of control signals to an external machine such as an engine, manufacturing robot or other computer-controlled device. Output interfaces 850, along with possibly other modules in the computer system, handle tasks involved in translating computer encoded data (typically binary data) to the appropriate form for output. These translation tasks can involve multiple steps, performed in various parts of a computer system. A display of base64 encoded data, for example, typically requires a conversion from encoded values to a series of original values. These character codes are then further translated by display driver circuits to produce the electrical signals needed to excite various pixels on a cathode ray tube (CRT) or liquid crystal display (LCD) type display.

Communication interfaces 860 represents circuits, devices, and/or instructions that allow a computer system to communicate with other information handling systems, such as over a telephone dial-up connection or over the world-wide internet.

In accordance with the practices of persons skilled in the art of computer programming, the invention according to specific embodiments is described herein with reference to symbolic representations of operations that are performed by an information processing system. Such operations are sometimes referred to as being computer-executed or processor-executed. It will be appreciated that the operations that are symbolically represented include the manipulation by a CPU or other logic circuitry of electrical signals representing data bits and the maintenance of data bits at memory locations in a memory system, as well as other processing of signals. The memory locations where data bits are maintained are physical locations that have particular electrical, magnetic, optical, or organic properties corresponding to the data bits.

Thus, it will be understood from the teachings herein that the present invention can, according to specific embodiments, be embodied into an information handling system and/or into different separable components of an information handling system.

Embodiments in a Programmed System

Figure 4:
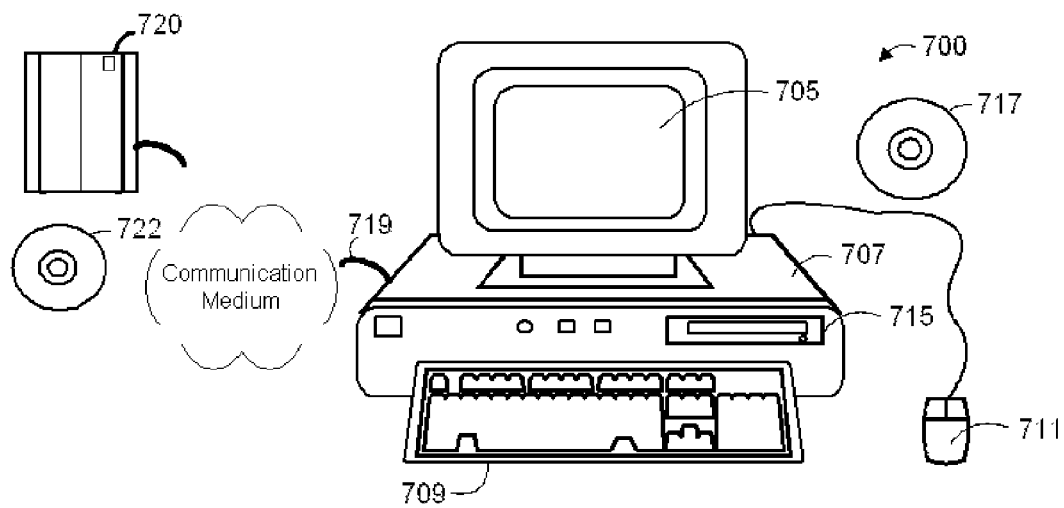
FIG. 4 is a block diagram showing a representative example logic device in which various aspects of the present invention may be embodied.

FIG. 4 is a block diagram showing a representative example logic device in which various aspects of the present invention may be embodied. The invention can be implemented in hardware and/or software. In some embodiments of the invention, the invention can be implemented entirely or in part in a client device or a server device, so long as both the client and server are capable of accepting a secondary channel. The invention may be embodied in a fixed media or transmissible program component containing logic instructions and/or data that when loaded into an appropriately configured computing device cause that device to perform according to the invention.

FIG. 4 shows digital device 700 that may be understood as a logical apparatus that can read instructions from media 717 and/or network port 719. Apparatus 700 can thereafter use those instructions to direct a server or client application as is known in the art and that further includes the components of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media or a memory. The invention may be embodies in whole or in part as software recorded on this fixed media. Communication port 719 may also be used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described.

Other Embodiments

The invention has now been explained with reference to specific embodiments. Other embodiments will be apparent to those of skill in the art. In particular, the client's digital computing device has been illustrated as a personal computer. However, the digital computing device is meant to be any device for interacting with a remote application, such as a multimedia messaging server.

In a number of specific embodiments, the invention operates in a special purpose computer system with specific hardware and software components that allow the computer to store and display textual information, and the include hardware and software interfaces that allow a user to read and enter textual information and indicate and manipulate text as described herein. In such a system, the invention transforms textual data stored on the computer system as described herein and the invention transforms a display to display the manipulated and transformed text as described herein.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method enabling a computer system to enable a user to select and copy text portions in a document and selectively replace text characters in copied text by configuring one or more processors in a computer system to:
    provide a text modification command set for identifying an existing text snippet associated with the user's current context within a text editing environment and duplicating and inserting the text snippet into a text editor and for automatically customizing the text snippet by replacing one or more characters in the snippet with user indicated characters;
    determine a start and stop position of a text snippet in a document;
    determine text characters to be modified in said text snippet using input received from a user interface;
    receive user input indicating replacement text characters to replace into copies of said text snippet using said user interface and the text modification command set;
    receive user input indicating an insertion point for modified copies of said text snippet using said user interface;
    activate a smart copy paste command in response to user input;
    said smart copy paste command inserting one or more modified copies of said text snippet, each modified copy containing character modifications indicated by the text modification command set and user input;
    store in electronic memory textual information including existing text snippets and modified text snippets; and
    display textual information including existing text snippets and modified text snippets.

2. The method of claim 1 further comprising configuring the one or more processors to provide:
    an interactive interface comprising at least one display component and at least one user input component;
    said interface displaying text to a user and receiving user input indications for modifying said text.

3. The method of claim 2 wherein the interactive interface is selected from the group consisting of:
    one or more logic modules interacting with system input and display components;
    a computing device including a display, a keyboard, and a pointing device;
    a display, a keyboard, and a mouse;
    a display, and at least one biometric input;
    a touch screen computing device.

4. The method of claim 1 further comprising configuring the one or more processors to receive user input from:
    a pointing device to highlight a portion of text to be copied;
    an input device to indicate a position just after a portion of text to be copied, with the beginning of said text indicated by a preexisting delimiter or determined from a user context; and
    an input device to indicate a position just after a portion of text to be copied and to also indicate a start position of text to be copied.

5. The method of claim 1 further comprising configuring the one or more processors to receive user input indicating modification text by one or more of:
    an input keyboard used to enter a text string to be modified;
    an input keyboard used to enter a text string to be modified, said text string including one or more wildcard characters or regular expressions;
    a pointing device used to indicate a string to be modified;
    a biometric input;
    a touch screen input.

6. The method of claim 1 further comprising configuring the one or more processors to receive user input indicating replacement text by one or more of:
    an input keyboard used to enter a text string to be used for replacement;
    an input keyboard used to enter a text string to be used for replacement, said text string including one or more wildcard characters or regular expressions;
    a pointing device used to indicate a string to be used for replacement;
    a touch screen keyboard.

7. The method of claim 1 further comprising configuring the one or more processors to receive user input indicating a command run by one or more of:
    an input keyboard to enter a command key or command key combination;
    a pointer to activate a context menu at a position in said document an select a smart copy paste command;
    an input keyboard to enter a command string;
    a pointing device to activate a smart copy command;
    a touch screen to activate said smart copy command.

8. The method of claim 1 wherein one or more modifications include complex operations based on one or more of conditions or calculations as specified in the text modification command set or knowledge of the syntax of a specific computer language being written.

9. The method of claim 1 further comprising configuring the one or more processors to:
    open one or more windows or panels displaying one or more of a copy of the text snippet to be modified, a display of the modified text snippet, and a place to enter a command string and/or modification or replacement text.

10. The method of claim 9 wherein as the replacement text is entered, the display of the modified text snippet dynamically changes to reflect the effects of the command.

11. A system for selecting and copying text portions in a document with selective replacing of text characters within said text portions, the system comprising:
    one or more processors and logic instructions configured to provide:
    electronic memory that stores textual information including existing text snippets and transformed text snippets; and
    an interactive interface module comprising at least one display component and at least one user input component and comprising a text editor development environment that accepts user input comprising text, the interactive interface module configured to display text to a user and to receive user input indications indicating characters in a source text portion for modification and indicating replacement characters and commands from a text modification command set for modifying one or more pasted text portions;
    a text modification command set that:
    identifies an existing text snippet associated with the user's current context within the development environment;
    duplicates and inserts the text snippet into the text editor and automatically customizes the text snippet based upon the text modification command set used by replacing one or more characters in the snippet with user indicated characters;
    said user input indications comprising one or more command run indications to activate said smart copy and paste command that duplicates the source text portion and inserts one or more modified pasted text portions into the editor and customizes the pasted text portion based upon the modification command set by replacing one or more characters in the source text portion with indicated characters such that upon said activation one or more modified copies of said source text portion are inserted in said document:

said interactive interface further configured to receive user input indications comprising one or more position indications of a context position in said text at which a smart copy paste command is activated;

electronic memory that stores textual information including existing source text portions and modified pasted text portions; and an electronic display configured to display textual information including existing source text portions and modified pasted text portions.

12. A system for automatically identifying and filling in source code snippets based upon a context of a user in a development environment, the system comprising:

one or more processors configured to provide:

a code editor that accepts user input comprising source code;

a code modification command set that:

identifies an existing code snippet associated with the user's current context within the development environment;

duplicates and inserts the code snippet into the code editor and automatically customizes the code snippet based upon the code modification command set used by replacing one or more characters in the snippet with user indicated characters;

electronic memory that stores textual information including existing code snippets and transformed code snippets; and an electronic display that displays textual information including existing code snippets and transformed code snippets, the electronic display comprising a plurality of light emitting circuits;

wherein said code modification command set transforms a portion of said plurality of light emitting circuits to display customized code snippets.

13. The system of claim 12, wherein the customization of the code snippet includes automatic replacement of indicated text characters in the code snippet with information contained in or derived from the command set.

14. The system of claim 12, wherein the customization of the code snippet includes complex operations based on conditions as specified in the command set, the complex operations being performed by a logic processor in electronic communication with an electronic memory.

15. The system of claim 12, wherein the customization of the code snippet includes knowledge of the syntax of the specific computer language being written, said knowledge stored in a rule set in an electronic memory and performed by a logic processor in electronic communication with the memory.

16. The system of claim 12, wherein the customization of the code snippet includes knowledge of the upper/lower case of the character set being replaced allowing for preservation of the upper/lower case of the replaced text.

17. The system of claim 12, wherein use of the code modification command set opens a new window that contains multiple panels, wherein the panels contain a copy of the code snippet, a display of the customized code snippet, and a place to enter or modify the command set.

18. The system of claim 17, wherein as the code modification command set is entered or modified, the display of the customized code snippet dynamically changes to reflect the effects of the command set.

19. The system of claim 17, wherein upon completion of the code modification command set closes the multiple paneled window, and duplicates and inserts the customized code snippet into the code editor based upon the code modification command set used.

20. A non-transitory processor-readable medium comprising processor-readable instructions configured to cause one or more processors to provide:

an interactive interface module comprising at least one display component and at least one user input component and comprising an editor that accepts user input comprising text, the interactive interface module configured to display text to a user and to receive user input indicating characters in a source text portion for modification and indicating replacement characters via a text modification command set for modifying one or more pasted text portions;

said user input indications comprising one or more command run indications to activate said smart copy and paste command that duplicates and inserts the source text portion into the editor and automatically customizes the source text portion based upon the modification command set used by replacing one or more characters in the snippet with indicated characters;

such that upon said activation one or more modified copies of said text portion are inserted in said document;

wherein said interactive interface module further is configured to receive user input indications comprising one or more position indications of a position in said text at which a smart copy paste command is activated;

electronic memory that stores textual information including existing source text portions snippets and transformed text portions; and an electronic display that displays textual information including existing source text portions and transformed source text portions.

* * * * *